United States Patent [19]

Bailes et al.

[11] 4,085,478

[45] Apr. 25, 1978

[54] SQUEEGEE APPARATUS

[76] Inventors: Thomas Alan Bailes; Eric Taylor, both of 2-6 Boswell Court, London WC1N 3PS, England

[21] Appl. No.: 730,438

[22] Filed: Oct. 7, 1976

[30] Foreign Application Priority Data

Oct. 17, 1975 United Kingdom ............... 42795/75

[51] Int. Cl.[2] ............................................. B60S 1/04

[52] U.S. Cl. .................................. 15/245; 15/210 A; 15/250.28

[58] Field of Search ........... 15/250.28, 250.19, 250.31, 15/250.4, 250.41, 250.42, 250.36, 245, 210 A

[56] References Cited

U.S. PATENT DOCUMENTS

| | | | |
|---|---|---|---|
| 1,165,704 | 12/1915 | Ousley | 15/250.28 |
| 1,169,280 | 1/1916 | Ousley | 15/250.28 |
| 1,370,463 | 3/1921 | Lomano | 15/250.28 X |
| 1,614,164 | 1/1927 | Littrow et al. | 15/250.28 X |
| 2,658,221 | 11/1953 | Nicoli | 15/210 A X |
| 3,086,237 | 4/1963 | Haanen | 15/245 |

*Primary Examiner*—Peter Feldman

*Attorney, Agent, or Firm*—Darby & Darby

[57] ABSTRACT

A squeegee apparatus consisting essentially of a pair of substantially parallel arms movable towards and away from one another while remaining parallel, each arm bearing on its inner face a squeegee blade, one squeegee blade being mounted on its respective arm via a resilient mounting.

10 Claims, 3 Drawing Figures

Fig. 1
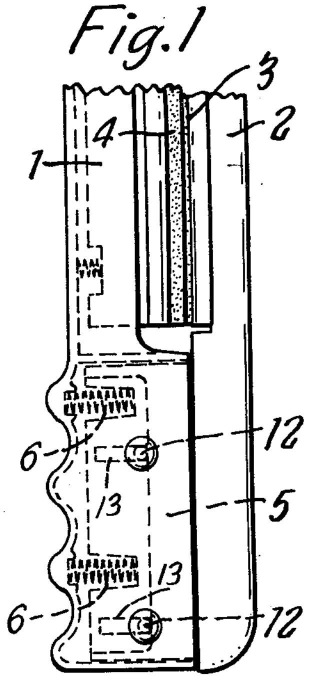
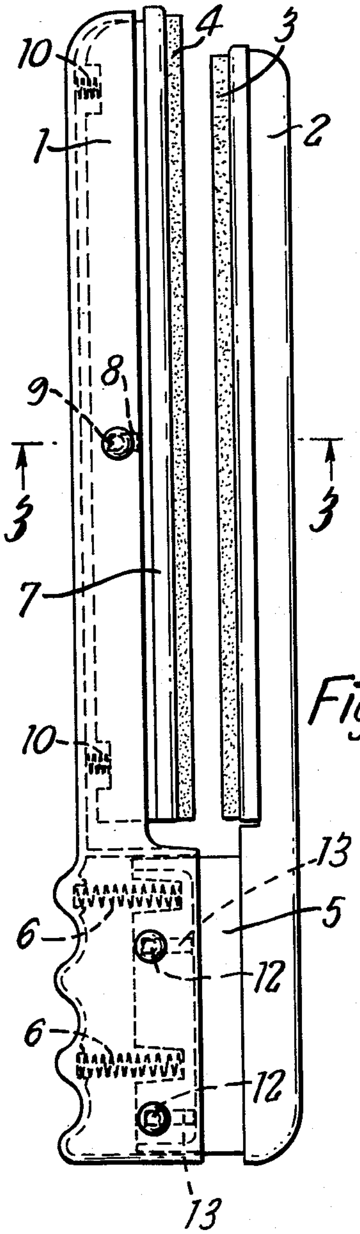
Fig. 2
Fig. 3
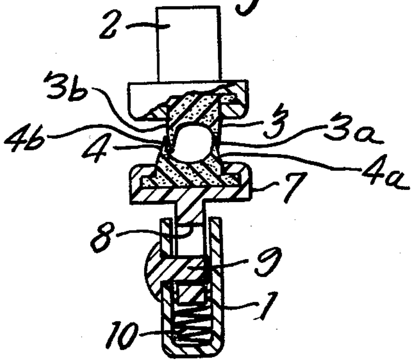

SQUEEGEE APPARATUS

This invention relates to squeegee apparatus, particularly for removing excess water from sheets of material such as photographic sensitised material after washing.

In drying wet sheet material a preliminary stage is to remove surplus water from the sheet. This can be done by draining under gravity (which is inefficient) or by shaking (which is messy and may damage the sheet). A simple method of removing excess water is to pass a squeegee across the sheet surface. A squeegee for this purpose usually consists of a stiff rubber blade held in a holder which constitutes or bears a handle. Generally, the process is carried out by laying the sheet on a flat surface, e.g. a draining board, and passing the squeegee over it one or more times, optionally turning the sheet material over between passes. Turning can be difficult since the sheet, pressed down on to the surface, may be difficult to pick up. Especially in the case of wet paper or card, damage to the corners can easily result.

Film wipers are known which act somewhat like a pair of scissors. Such wipers are gripped with a piece of sheet material between its jaws; the wipers are then moved, usually downward, the sheet material being held in position. Satisfactory operation using such wipers in this way is often difficult to achieve since there is a tendency, if the blades will not easily move down the sheet material, to pull or grip harder, which may tear the material if the force is too great and often tends to increase difficulty of starting the wiper blades moving. Mangle type apparatus is also known for analogous purposes, but this tends to be complex and expensive to manufacture.

According to the present invention there is provided squeegee apparatus comprising a pair of substantially parallel arms movable towards and away from one another while remaining parallel, and each bearing on its inner face a squeegee blade, one blade being mounted on its respective arm via a resilient mounting, e.g. a spring. Preferably, the resiliently mounted blade is also pivotally mounted to enable it to rock about a central axis substantially at its mid point and perpendicular to the plane of the arms.

Preferably stop means are provided to limit the closest approach of the arms to one another. Preferably the arms are spring biased apart and further stop means may be provided to stop the arms becoming too far separated. The direction of movement parts of the arms is preferably perpendicular to the direction of the arms. Preferably one arm extends past the end of the other to assist in guiding the sheet into the gap between them.

One embodiment of squeegee apparatus according to the invention is illustrated by way of example in the accompanying drawings in which:

FIG. 1 is a side view of squeegee apparatus according to the invention in closed position;

FIG. 2 is similar to FIG. 1 showing the apparatus in open position, and

FIG. 3 is a cross-section along the lines 3—3 of FIG. 2 on an enlarged scale.

Referring to the drawings, the apparatus comprises a pair of substantially parallel arms 1 and 2. Arm 2 bears on its inner surface a squeegee blade 3. The end of arm 2 has a lateral tongue 5 which slides in a corresponding slot in the end of arm 1 and is held in that slot by two pins 12 engaged in one side of arm 1. Arms 1 and 2 are biased apart by compression springs 6 located in the slot and engaging against arm 1 and tongue 5. The tongue 5 is formed with two slots 13 through which the pins 12 pass. As may be seen by comparing FIGS. 1, and 2, the length of the slots 13 determine and limit, by providing stops, the closest approach of the arms 1 and 2 to one another (FIG. 1) and the degree of separation of the arms 1 and 2 (FIG. 2).

Set in arm 1 is a bar 7 which bears on its face a squeegee blade 4 and which has a central slot 8. Bar 7 is held captive in arm 1 by means of a stud 9 which passes through slot 8 and is engaged in one side wall of arm 1, which has a U-shaped cross-section as shown in FIG. 3.

Between the lower side of bar 7 and the inside of arm or jaw 1 are two coil springs 10. If desired, a leaf spring can be used in place of the coil springs 10.

It will be seen that the mounting of bar 7 enables it to move both into and out of the arm 1 and to pivot about an axis substantially on pin 9.

In use, the device is held in the open position as shown in FIG. 2 and the sheet of material it is desired to wipe placed between squeegee blades 3 and 4. Placing of the material is facilitated by blade 4 extending beyond blade 3 as shown.

Arms 1 and 2 are now brought together as shown in FIG. 1, which causes blades 3 and 4 to interengage with distortion of those blades which bear against the surface of the sheet material. If the device is now drawn across the sheet, water on both sides of the sheet is removed by the squeegee blades 3 and 4. It should be observed that the force with which the squeegee blades are pressed together in the position as shown in FIG. 1 is independent of the force with which jaws 1 and 2 are held together, and depends rather on the force generated by springs 10. This force should be appropriate for the use to which the device is intended to be placed, e.g. for wiping wet photographic sensitised sheet material.

We claim:

1. Hand-held squeegee apparatus comprising:

first and second parallel arms adapted to be moved toward and away from one another while always remaining parallel;

first and second squeegee blades, one blade mounted on a first portion of each of said arms, at least one of said blades being resiliently mounted on its portion, said blades being positioned on their respective portions so as to face one another;

means for coupling corresponding second portions of said arms to one another so as to always maintain said two second portions parallel to one another; and compression means positioned between said two second portions for urging said arms away from one another;

said second portions being adapted to be squeezed together by hand for urging said first and second arms toward one another.

2. Apparatus according to claim 1 wherein the resilient mounting is a spring mounting.

3. Apparatus according to claim 1 wherein the resiliently mounted blade is pivotally mounted enabling it to rock about a central axis substantially at its mid point and perpendicular to the plane of the arms.

4. Apparatus according to claim 1 and including stop means limiting the closest approach of the arms to one another.

5. Apparatus according to claim 1 and comprising stop means limiting the degree of separation of the arms.

6. Apparatus according to claim 1 wherein the direction of movement apart of the arms is perpendicular to the direction of the arms.

7. Apparatus according to claim 1 wherein the free end of one arm projects beyond the free end of the other arm.

8. Apparatus according to claim 1 wherein said compression means is a spring.

9. Apparatus according to claim 1 wherein each of said squeegee blades is formed with a pair of ribs, the ribs of each blade facing the ribs of the other blades, said ribs being so arranged that when said blades are urged toward and proximate one another at least one of the ribs of one blade is located between a pair of ribs of the other blade.

10. Apparatus according to claim 9 wherein said ribs are so arranged that when said blades are urged proximate one another one rib of each blade is located between the pair of ribs of the other blade.

* * * * *